United States Patent
Cui et al.

(10) Patent No.: US 12,509,637 B2
(45) Date of Patent: Dec. 30, 2025

(54) CATALYST FOR RESIDUE SUSPENDED BED HYDROCRACKING AND PREPARATION METHOD AND APPLICATION THEREOF

(71) Applicants: Fuzhou University, Quanzhou (CN); Qingyuan Innovation Laboratory, Quanzhou (CN)

(72) Inventors: Qingyan Cui, Quanzhou (CN); Weiwei Feng, Quanzhou (CN); Xiaojun Bao, Quanzhou (CN); Tinghai Wang, Quanzhou (CN); Pei Yuan, Quanzhou (CN)

(73) Assignees: Fuzhou University, Quanzhou (CN); Qingyuan Innovation Laboratory, Quanzhou (CN)

( * ) Notice: Subject to any disclaimer, the term of this patent is extended or adjusted under 35 U.S.C. 154(b) by 562 days.

(21) Appl. No.: 18/114,292

(22) Filed: Feb. 27, 2023

(65) Prior Publication Data
US 2023/0323218 A1    Oct. 12, 2023

(30) Foreign Application Priority Data
Apr. 12, 2022  (CN) .................. 202210376927.X

(51) Int. Cl.
*C10G 47/02*   (2006.01)
*B01J 21/06*   (2006.01)
(Continued)

(52) U.S. Cl.
CPC .............. *C10G 47/02* (2013.01); *B01J 21/06* (2013.01); *B01J 23/745* (2013.01); *B01J 37/06* (2013.01);
(Continued)

(58) Field of Classification Search
CPC . B01J 21/06; B01J 21/08; B01J 23/745; B01J 23/755; B01J 23/80; B01J 23/8892;
(Continued)

(56) References Cited

U.S. PATENT DOCUMENTS

| 6,139,723 A | 10/2000 | Pelrine et al. |
| 10,195,588 B1 | 2/2019 | Do et al. |

FOREIGN PATENT DOCUMENTS

| CN | 103877999 A | 6/2014 |
| CN | 105126899 A | 12/2015 |
| CN | 109395769 A | 3/2019 |
| CN | 113926488 A | 1/2022 |

OTHER PUBLICATIONS

McFarland, E.W., et al., 2013, Chemical Reviews, 113, 4391-4427. <http://dx.doi.org/10.1021/cr300418s> (Year: 2013).*
(Continued)

*Primary Examiner* — Brian A McCaig
(74) *Attorney, Agent, or Firm* — Bayramoglu Law Offices LLC

(57) ABSTRACT

A catalyst for residue suspended bed hydrocracking and a preparation method and application thereof are disclosed. The catalyst is obtained by mixing a VIIB or VIIIB group transition metal salt solution with a ferric salt solution, conducting parallel-flow precipitation with an alkaline solution, adding a silicon source, and then conducting aging, washing, drying, and calcination. The catalyst has a stable structure and excellent hydrogenation activity. When used in a residue suspended bed hydrocracking reaction, the yield of liquid is up to 91 wt %, the yield of gasoline and diesel oil is up to 60 wt %, and both the yield of gas and the yield of coke are low. The catalyst has a good application prospect in residue suspended bed hydroconversion process.

17 Claims, 1 Drawing Sheet

(51) Int. Cl.
  *B01J 23/745* (2006.01)
  *B01J 37/06* (2006.01)
  *B01J 37/08* (2006.01)
  *C10G 47/26* (2006.01)

(52) U.S. Cl.
  CPC .............. *B01J 37/08* (2013.01); *C10G 47/26* (2013.01); *C10G 2300/703* (2013.01)

(58) Field of Classification Search
  CPC ........ B01J 37/031; B01J 37/035; B01J 37/06; B01J 37/08; B01J 37/088; C10G 47/02; C10G 47/12; C10G 47/26; C01B 33/00; C01P 2002/82
  See application file for complete search history.

(56) References Cited

OTHER PUBLICATIONS

Li, J.Z., et al., 2013, Materials Science in Semiconductor Processing, 16, 143-148. <http://dx.doi.org/10.1016/j.mssp.2012.05.014> (Year: 2013).*

Zhong, J.B., et al., 2012, Materials Research Bulletin, 47, 11, 3893-3896. <http://dx.doi.org/10.1016/j.materresbull.2012.08.031> (Year: 2012).*

Ren, S., et al., 2021, Advances in Applied Ceramics, 120, 2, 95-103. <https://doi.org/10.1080/17436753.2021.1889754> (Year: 2021).*

* cited by examiner

CATALYST FOR RESIDUE SUSPENDED BED HYDROCRACKING AND PREPARATION METHOD AND APPLICATION THEREOF

CROSS REFERENCE TO THE RELATED APPLICATIONS

This application is based on and claims priority to Chinese Patent Application No. 202210376927.X, filed Apr. 12, 2022, the entire contents of which are incorporated herein by reference.

TECHNICAL FIELD

The present disclosure relates to preparation of a metal-doped ferrosilicon catalyst for suspended bed hydrocracking and application of the catalyst in residue suspended bed hydrocracking, and belongs to the technical field of preparation of catalytic materials and energy.

BACKGROUND

At present, although a hydrogen source and other new energy sources have been increasingly developed, petroleum is still one of main energy sources in the present world. Due to the current situation that petroleum reserves are increasingly decreased, efficient conversion of the petroleum is particularly important. During processing of the petroleum, residual oil with large molecular weight and complex composition accounts for about 50%, so that the reuse of the residual oil has been widely concerned by researchers. Among existing conversion technologies of the residual oil, suspended bed hydrocracking process is regarded as a technology for efficient conversion of the residual oil with the highest application prospect due to the advantages of simple process, high adaptability of raw materials and high conversion rate. As the core of the technology for hydrogenation in a suspended bed, a catalyst greatly affects the reaction rate, the conversion rate, the yield of light oil and the consumption of hydrogen. Thus, the development and design of a catalyst with high activity, high selectivity, and low cost are of great importance for the development of the technology for hydrogenation in a suspended bed.

Currently, a catalyst for hydrocracking in a suspended bed mainly includes two types: a homogeneous catalyst and a heterogeneous catalyst. The homogeneous catalyst includes a water-soluble catalyst and an oil-soluble catalyst, and the heterogeneous catalyst mainly includes a solid powder catalyst. The homogeneous catalyst has good dispersion in the residual oil. However, the preliminary preparation process of the water-soluble catalyst is complex, and the cost of the oil-soluble catalyst is high, so that industrial application of such catalyst is limited. The solid powder catalyst mainly includes natural minerals in the early stage, is affected by impurities and origins, and has low repeatability, so that industrial production in a large scale is not facilitated. In the later stage, a supported catalyst is developed by supporting an active metal on a carrier material such as alumina, silica, and coke based on an impregnation method, and a hydrocracking reaction of the residual oil is carried out based on the advantages of an active site of the metal on the catalyst and the thermal stability of the carrier. However, the preparation process of such catalyst is relatively complex, and active components are unlikely to be dispersed uniformly.

According to CN105126899A, a preparation method of a molecular sieve supported catalyst for hydrogenation of inferior heavy oil in a suspended bed is disclosed. According to the catalyst, a Y-type molecular sieve is used as a carrier, and VIB and VIII family transition metals are supported for a hydrogenation reaction of the heavy oil in the suspended bed. The Y-type molecular sieve is synthesized with bauxite and diatomite as raw materials. Calculated based on metal oxides, the supported transition metals have a supporting amount of 15 wt %. In the scheme, the method has a complex preparation process, and since the composition of natural minerals is difficult to control, the consistency of the morphology and crystallinity of the prepared Y-type molecular sieve cannot be ensured, so that the obtained catalyst has low stability.

According to CN103877999A, a preparation method of a catalyst for hydrogenation of coal tar heavy oil is disclosed. According to the catalyst, pulverized coal is used as a carrier, and the carrier is mechanically mixed with ferric sulfide and ferric oxide. In addition, mineral powders or metal salt aqueous solutions of molybdenum, nickel, tungsten, and cobalt of different concentrations are added according to coal tar including different raw materials, and then subjected to wet pulverization, so that active components are uniformly dispersed on the surface of the pulverized coal carrier. In the scheme, the method has a complex preparation process, and the active components are added in two times, so that the time cost and the economic cost are high, and the prepared catalyst has low catalytic activity for hydrogenation of the heavy coal tar.

According to U.S. Pat. No. 6,139,723, a highly dispersed iron-based ionic liquid or liquid gel catalyst with ion modification and metal promotion for hydrogenation or a hydrocracking reaction of heavy oil is disclosed. The catalyst is obtained by subjecting a ferric sulfate or halotrichite solution to precipitation, followed by modification with a sulfate anion or one or more of cobalt, molybdenum, palladium, nickel, and tungsten. According to reaction results, it is shown that the catalyst has higher residual oil conversion rate in a reaction than an ordinary powdered iron-based catalyst. However, due to an uncontrollable preparation method, the catalyst has not been widely used in industry.

According to U.S. Ser. No. 10/195,588B1, an iron-molybdenum catalyst for hydrocracking in a suspended bed and a preparation method thereof are disclosed. The catalyst is used for converting a heavy hydrocarbon raw material into a light hydrocarbon product. Metals in the catalyst mainly include iron and molybdenum, and meanwhile, aluminum is used as a third catalytic component. The mass content of Mo in a reaction is about 500 ppm, the mass fraction of the iron is 5 times that of Mo, and the conversion rate of the heavy hydrocarbon is about 85%. The aluminum and the iron generally exist as iron and aluminum mineral particles. Due to the presence of the aluminum, the content of the molybdenum can be reduced. Since an adsorption site of a mesoporous phase is provided by the aluminum, metallic vanadium and nickel capable of poisoning the molybdenum as an active phase are adsorbed. Considering that the three metals are prepared by physical mixing, the distribution of active sites is not uniform, and the conversion rate of heavy oil is unstable.

Due to the advantages of high geological reserves, low cost and environmental friendliness, the metallic iron is an important research object for various researchers. At present, a supported catalyst is mainly used in most of upgrading reactions of heavy oil. In particular, molybdenum and other metals with high activity are used as an active phase. However, the cost of the molybdenum is relatively high. In order to reduce the preparation cost of the catalyst, iron with low activity is usually added by researchers. A bimetal is supported on a carrier such as alumina, silica, or activated carbon by using an impregnation method. However, the catalytic effect is not very good. The present disclosure provides a metal-doped ferrosilicon catalyst for hydrocracking in a suspended bed, which is prepared by using a simple and green process and cheap raw materials based on a co-precipitation method. The catalyst has a stable internal bond energy structure and a good effect of a hydrocracking reaction of residual oil in a suspended bed. The yield of gasoline and diesel oil is high, the yield of coke is low, and a good industrial application prospect is achieved.

SUMMARY

In view of the above-mentioned defects of existing technologies for preparation of catalysts, an objective of the present disclosure is to provide a preparation method of a catalyst for residue suspended bed hydrocracking, which can effectively solve the problems of low conversion rates of raw materials, complex processes of traditional supporting methods, high preparation cost and high yield of coke.

The objective of the present disclosure is realized by using the following technical schemes.

A catalyst for residue suspended bed hydrocracking is provided. The catalyst includes a ferrosilicon material doped with a VIIB or VIIIB group transition metal.

The catalyst for residue suspended bed hydrocracking in the present disclosure is obtained by mixing a VIIB or VIIIB group transition metal salt solution with a ferric salt solution, conducting parallel-flow precipitation with an alkaline solution, adding a silicon source, and then conducting aging, washing, drying, and calcination.

According to the catalyst for residue suspended bed hydrocracking in the present disclosure, in the metal-doped ferrosilicon catalyst, the VIIB or VIIIB group transition metal salt solution includes one or more of manganese nitrate, manganese sulfate, cobalt nitrate, cobalt sulfate, nickel nitrate, nickel sulfate, copper nitrate, copper sulfate, zinc nitrate, and zinc sulfate.

According to the catalyst for residue suspended bed hydrocracking in the present disclosure, in the metal-doped ferrosilicon catalyst, the ferric salt includes one or more of ferric nitrate, ferric chloride, ferric sulfate, ferric phosphate, and ferric perchlorate.

According to the catalyst for residue suspended bed hydrocracking in the present disclosure, in the metal-doped ferrosilicon catalyst, the silicon source includes one or more of water glass, sodium silicate, silica, industrial silica gel, silica sol, and tetraethyl orthosilicate.

According to the catalyst for residue suspended bed hydrocracking in the present disclosure, in the metal-doped ferrosilicon catalyst, a molar ratio of a doping metal oxide to ferric oxide to silica is (1-10):(1-10):1.

A catalyst for residue suspended bed hydrocracking in the present disclosure is prepared in the following steps:
(1) adding 50-500 mL of deionized water into a reaction vessel and stirring at 30-90° C.; and
(2) adding the VIIB or VIIIB group transition metal salt and the ferric salt into deionized water for dissolution to prepare a mixed salt solution with a concentration of 1-30 g/mL, separately loading the mixed salt solution and the alkaline solution into an acid-base burette to obtain a resulting solution and slowly dropping the resulting solution into the deionized water in step (1), and adjusting a pH value to make the mixed salt solution precipitated completely to obtain a sol, where a reaction time is controlled at 0.5-5 hours; and (3) subjecting the sol obtained in step (2) to stabilization at a pH of 6.0-12.0 for 10-180 minutes to obtain stabilized sol; and
(4) rapidly adding the silicon source into the stabilized sol obtained in step (3) at a predetermined ratio within 1-30 minutes to obtain a resulting sol; and
(5) subjecting the resulting sol obtained in step (4) to aging and stabilization at an unchanged temperature of 30-90° C. and an unchanged pH value of 6.0-12.0 for 10-180 minutes to obtain a first substance; and
(6) subjecting the first substance obtained in step (5) to filtration and washing to neutral pH value to obtain a second substance; and
(7) subjecting the second substance obtained in step (6) to drying at 100-200° C. for 4-10 hours to obtain a third substance; and
(8) putting the third substance obtained in step (7) in a Muffle furnace for calcination at 300-900° C. for 1~10 hours to obtain a metal-doped ferrosilicon catalyst.

Further, in step (1), 80-400 mL of the deionized water is used, and the stirring temperature is 35-85° C.

Further, in step (2), the VIIB or VIIIB group transition metal salt solution is selected from one or more of manganese nitrate, manganese sulfate, cobalt nitrate, cobalt sulfate, nickel nitrate, nickel sulfate, copper nitrate, copper sulfate, zinc nitrate, and zinc sulfate.

Further, in step (2), the inorganic ferric salt solution is selected from one or more of ferric nitrate, ferric chloride, ferric sulfate, ferric phosphate, and ferric perchlorate.

Further, in step (2), the alkaline solution is selected from one or more of sodium hydroxide, potassium hydroxide, sodium carbonate, sodium bicarbonate, and ammonia; and the pH value is 5.0-10.0, and titration is conducted for 1.0-4.5 hours.

Further, in step (3), the stabilization is conducted for 30-160 minutes.

Further, in step (4), the silicon source is selected from one or more of water glass, sodium silicate, silica, industrial silica gel, silica sol, and tetraethyl orthosilicate, and a silicon compound is added for 5-25 minutes.

Further, in step (4), the silicon source is added in an amount for controlling a molar ratio of a doping metal oxide to ferric oxide to silica at (1-10):(1-10):1.

Further, in step (5), the aging is conducted at a temperature of 40-80° C. and a pH value of 7.0-11.0 for 30-160 minutes.

Further, in step (7), the drying is conducted at a temperature of 120-180° C. for 5-9 hours.

Further, in step (8), the calcination is conducted at a temperature of 400-800° C.

In summary, compared with the prior art, the preparation method of a metal-doped ferrosilicon catalyst for residue suspended bed hydrocracking provided in the present disclosure has the following advantages.

(1) The catalyst of the present disclosure has a simple preparation method, and active metals can be combined with a carrier with good physical and chemical properties without using a traditional complex load method. In addition, the inorganic ferric salt and the industrial silicon source which are low in cost are used as main raw materials, and a good industrial application prospect is achieved.

(2) The metal-doped ferrosilicon catalyst prepared by the present disclosure is not simply obtained by impregnation with an oxide and combination with a van der Waals force, but is obtained by bonding between a bimetal and silicon to form a Fe—O—Si bond (as shown in FIG. 1 for details, infrared characterization diagram). A local electronic structure of Fe atoms (as shown in FIG. 2, XAFS characterization) is changed, and the catalytic activity of the catalyst is greatly improved. A high yield of gasoline and diesel oil and a high conversion rate of coke can be achieved, and the yield of coke is significantly decreased.

(3) In the present disclosure, a parallel-flow precipitation method has the effect of fractional precipitation of a metal salt, so that a metal can be precipitated more completely, and a more stable compound is formed.

DETAILED DESCRIPTION OF THE EMBODIMENTS

Figure 1:
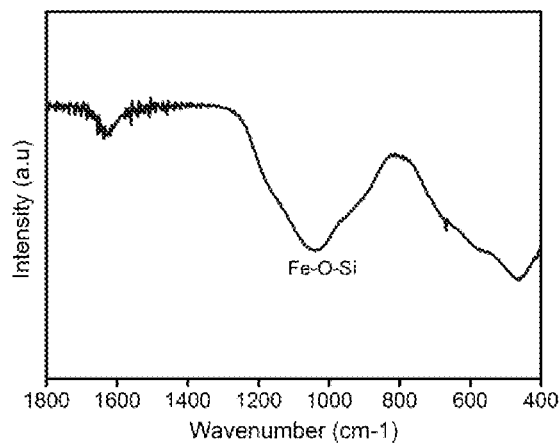
FIG. 1 is an infrared characterization diagram of a catalyst prepared in Example 2, in which bonding in ferrosilicon is mainly analyzed.
Figure 2:
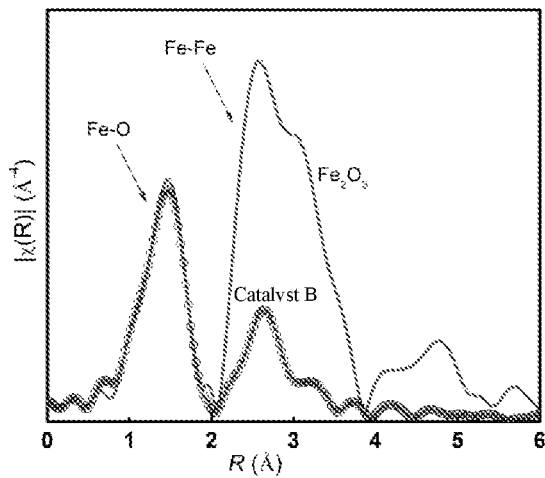
FIG. 2 is an XAFS characterization diagram of the catalyst prepared in Example 2.

The implementation process and resulting beneficial effects of the present disclosure are described in detail below in conjunction with specific embodiments to facilitate better understanding of the essence and characteristics of the present disclosure, and are not construed as limitations of the implementation scope of the application.

Example 1

Ferric nitrate and nickel nitrate were weighed, and dissolved in 50 g of water. 40 g of ammonia with a concentration of 28% was weighed, and dissolved in 60 g of water. An obtained salt solution and an obtained alkaline solution were separately loaded into a burette, slowly dropped into 100 mL of deionized water in parallel flow, and continuously stirred at 60° C. Titration was slowly conducted at a pH value of 8.5, and the reaction time was controlled at 1.5 hours. After the titration was completed, the salt solution was subjected to stabilization for 30 minutes. Water glass with a mass fraction of 27.68% was weighed, diluted with water to control a molar ratio of a doped metal oxide to ferric oxide to silica at 1:1:1, and then quickly added into sol obtained above within 10 minutes. Aging was conducted at an unchanged temperature of 60° C. and an unchanged pH value of 8.5 for 60 minutes. Then, an obtained substance was subjected to filtration, washing to neutral pH value, and drying at 150° C. for 10 hours. An obtained substance was ground, and put in a Muffle furnace for calcination at 500° C. for 3 hours to obtain a Ni-based ferrosilicon catalyst A.

Example 2

Ferric nitrate and zinc nitrate were weighed, and dissolved in 50 g of water. 40 g of ammonia with a concentration of 28% was weighed, and dissolved in 60 g of water. An obtained salt solution and an obtained alkaline solution were separately loaded into a burette, slowly dropped into 100 mL of deionized water in parallel flow, and continuously stirred at 60° C. Titration was slowly conducted at a pH value of 8.5, and the reaction time was controlled at 1.5 hours. After the titration was completed, the salt solution was subjected to stabilization for 30 minutes. Water glass with a mass fraction of 27.68% was weighed, diluted with water to control a molar ratio of a doped metal oxide to ferric oxide to silica at 1:1:1, and then quickly added into sol obtained above within 10 minutes. Aging was conducted at an unchanged temperature of 60° C. and an unchanged pH value of 8.5 for 60 minutes. Then, an obtained substance was subjected to filtration, washing to neutral pH value, and drying at 150° C. for 10 hours. An obtained substance was ground, and put in a Muffle furnace for calcination at 500° C. for 3 hours to obtain a Zn-based ferrosilicon catalyst B.

Example 3

Ferric nitrate and cobalt nitrate were weighed, and dissolved in 50 g of water. 40 g of ammonia with a concentration of 28% was weighed, and dissolved in 60 g of water. An obtained salt solution and an obtained alkaline solution were separately loaded into a burette, slowly dropped into 100 mL of deionized water in parallel flow, and continuously stirred at 60° C. Titration was slowly conducted at a pH value of 8.5, and the reaction time was controlled at 1.5 hours. After the titration was completed, the salt solution was subjected to stabilization for 30 minutes. Water glass with a mass fraction of 27.68% was weighed, diluted with water to control a molar ratio of a doped metal oxide to ferric oxide to silica at 1:1:1, and then quickly added into sol obtained above within 10 minutes. Aging was conducted at an unchanged temperature of 60° C. and an unchanged pH value of 8.5 for 60 minutes. Then, an obtained substance was subjected to filtration, washing to neutral pH value, and drying at 150° C. for 10 hours. An obtained substance was ground, and put in a Muffle furnace for calcination at 500° C. for 3 hours to obtain a Co-based ferrosilicon catalyst C.

Example 4

Ferric nitrate and manganese nitrate were weighed, and dissolved in 50 g of water. 40 g of ammonia with a concentration of 28% was weighed, and dissolved in 60 g of water. An obtained salt solution and an obtained alkaline solution were separately loaded into a burette, slowly dropped into 100 mL of deionized water in parallel flow, and continuously stirred at 60° C. Titration was slowly conducted at a pH value of 8.5, and the reaction time was controlled at 1.5 hours. After the titration was completed, the salt solution was subjected to stabilization for 30 minutes. Water glass with a mass fraction of 27.68% was weighed, diluted with water to control a molar ratio of a doped metal oxide to ferric oxide to silica at 1:1:1, and then quickly added into sol obtained above within 10 minutes. Aging was conducted at an unchanged temperature of 60° C. and an unchanged pH value of 8.5 for 60 minutes. Then, an obtained substance was subjected to filtration, washing to neutral pH value, and drying at 150° C. for 10 hours. An obtained substance was ground, and put in a Muffle furnace for calcination at 500° C. for 3 hours to obtain a Mn-based ferrosilicon catalyst D.

Example 5

Ferric nitrate and copper nitrate were weighed, and dissolved in 50 g of water. 40 g of ammonia with a concentration of 28% was weighed, and dissolved in 60 g of water. An obtained salt solution and an obtained alkaline solution were separately loaded into a burette, slowly dropped into 100 mL of deionized water in parallel flow, and continuously stirred at 60° C. Titration was slowly conducted at a pH value of 8.5, and the reaction time was controlled at 1.5 hours. After the titration was completed, the salt solution was subjected to stabilization for 30 minutes. Water glass with a mass fraction of 27.68% was weighed, diluted with water to control a molar ratio of a doped metal oxide to ferric oxide to silica at 1:1:1, and then quickly added into sol obtained above within 10 minutes. Aging was conducted at an unchanged temperature of 60° C. and an unchanged pH value of 8.5 for 60 minutes. Then, an obtained substance was subjected to filtration, washing to neutral pH value, and drying at 150° C. for 10 hours. An obtained substance was ground, and put in a Muffle furnace for calcination at 500° C. for 3 hours to obtain a Cu-based ferrosilicon catalyst E.

Comparative Example 1 (Simple Impregnation Method for Supporting)

1 g of a silica powder was weighed to test water absorption. Ferric nitrate and zinc nitrate were dissolved in water, stirred for dissolution, and supported on a dried silica powder in equal volume to control a molar ratio of zinc oxide to ferric oxide to silicon oxide at 1:1:1. An obtained mixture was subjected to standing at room temperature for 24 hours, followed by drying in an oven at 120° C. for 10 hours. An obtained substance was ground, and put in a Muffle furnace for calcination at 500° C. for 3 hours to obtain an iron-zinc-silicon catalyst F.

In order to prove an application effect of a catalyst carrier of the present disclosure in residue suspended bed hydrocracking, properties of the catalysts in examples and the comparative example are evaluated in the present disclosure with vacuum residual oil as a reaction raw material (properties are as shown in Table 1). 40.0 g of the vacuum residual oil and 1.2 g of the catalysts in Examples 1-5 were added into a high-pressure reactor with a volume of 250 mL. A reaction was carried out at a pressure of 11 MPa and a temperature of 430° C. for 3 hours. After the reaction was completed, the pressure was relieved when the temperature was lowered to room temperature. Liquid oil was taken out, and weighed. A product was subjected to reduced pressure distillation by using a reduced pressure distillation device. Gasoline, diesel oil, wax oil, and unconverted residual oil were separated by using a boiling range cutting method. The yield of each part, the conversion rate of residual oil, the yield of gas, and the yield of coke were calculated. Experimental results are as shown in Table 2.

TABLE 1

| Properties of vacuum residual oil | |
| --- | --- |
| Analysis Item | Test result |
| Density (20° C.), Kg/m$^3$ | 985.5 |
| Viscosity (100° C.), cSt | 84.7 |
| Residual carbon value, wt. % | 10.7 |
| S, wt. % | 3.1 |
| Metal content, ppm | |
| Fe | 11.9 |
| Ni | 46.2 |
| V | 111.6 |

TABLE 2

| Distribution table of a product of a hydrocracking reaction of vacuum residual oil in a suspended bed | | | | | | |
| --- | --- | --- | --- | --- | --- | --- |
| Catalyst | A | B | C | D | E | F |
| Conversion rate of residual oil/% | 68.7 | 87.1 | 84.2 | 82.2 | 80.5 | 85.0 |
| Yield of gasoline/wt % | 17.4 | 23.9 | 21.0 | 17.7 | 17.1 | 22.1 |
| Yield of diesel oil/wt % | 31.0 | 36.4 | 32.6 | 32.9 | 29.5 | 34.3 |
| Yield of wax oil/wt % | 21.0 | 15.5 | 27.3 | 25.7 | 26.5 | 17.1 |
| Yield of liquid/wt % | 90.0 | 84.3 | 91.4 | 87.9 | 85.9 | 83.4 |
| Yield of gas/wt % | 9.1 | 13.7 | 7.5 | 11.8 | 13.0 | 14.2 |
| Yield of coke/wt % | 0.9 | 2.0 | 1.1 | 0.3 | 1.1 | 2.4 |
| Total yield of gasoline and diesel oil/wt % | 48.4 | 60.3 | 53.6 | 50.5 | 46.5 | 56.4 |

From the data in Table 2, it can be seen that when the catalyst for residue suspended bed hydrocracking prepared by the method of the present disclosure is used, both the yield of liquid and the yield of gasoline and diesel oil are high. Through comparison of reaction results of the Ni-based ferrosilicon catalyst, the Zn-based ferrosilicon catalyst, the Co-based ferrosilicon catalyst, the Mn-based ferrosilicon catalyst, and the Cu-based ferrosilicon catalyst, it can be seen that when the Zn-based ferrosilicon catalyst is used, the yield of gasoline and diesel oil is the highest, which reaches 60.3 wt %. The conversion rate of residual oil reaches 87.1%. However, the yield of gas and the yield of coke are also relatively high, and are 13.7 wt % and 2.1 wt % respectively. When the Co-based ferrosilicon catalyst is used, the yield of liquid is the highest, which reaches 91.4 wt %. The yield of gasoline and diesel oil is also relatively high, which reaches 53.6 wt %. However, in the reaction of preparing the iron-zinc-silicon catalyst by directly supporting a ferric salt and a zinc salt on silica, the conversion rate is 85.0 wt %, the yield of gasoline and diesel oil is 56.4 wt %, both the yields are lower than those of the Zn-based ferrosilicon catalyst, and the yield of gas and coke is relatively high, which reaches 16.6 wt %, indicating that the directly supported bimetallic catalyst has a poorer effect of hydrocracking of heavy oil than the bimetallic catalyst prepared by the present disclosure. In addition, the five catalysts have a liquid yield of greater than 84 wt %, less coke is produced, and the yield of diesel oil is almost greater than 30 wt %. Therefore, from the above results, it can be seen that the metal-doped ferrosilicon catalyst for residue suspended bed hydrocracking in the present disclosure has high catalytic activity, low yield of gas and low yield of coke, and will have a good application prospect in residue suspended bed ahydrocracking reaction.

The foregoing descriptions are merely preferred embodiments of the present disclosure, and all equivalent changes and modifications made according to the scope of the present disclosure for patent application shall fall within the scope of the present disclosure.

The invention claimed is:

1. A method for preparing a catalyst for residue suspended bed hydrocracking, wherein the catalyst is a ferrosilicon material doped with a VIIB or VIIIB group transition metal, and the method comprises mixing a VIIB or VIIIB group transition metal salt solution with a ferric salt solution to obtain a mixed salt solution, conducting parallel-flow precipitation with an alkaline solution on the mixed salt solution to obtain a first mixture, adding a silicon source to the first mixture to obtain a second mixture, and aging, washing, drying, and calcinating the second mixture to obtain the catalyst.

2. The method according to claim 1, further comprising the following steps:

(1) adding 50-500 mL of deionized water into a reaction vessel and stirring at 30-90° C.; and (2) adding the VIIB or VIIIB group transition metal salt solution and the ferric salt solution into deionized water for dissolution to prepare the mixed salt solution with a concentration of 1-30 g/mL, separately loading the mixed salt solution and the alkaline solution into an acid-base burette to obtain a resulting solution and slowly dropping the resulting solution into the deionized water in step (1), and adjusting a pH value so that the mixed salt solution precipitates completely to obtain a sol, wherein a reaction time is controlled at 0.5-5 hours; and (3) subjecting the sol obtained in step (2) to stabilization in a water bath kettle for 10-180 minutes to obtain stabilized sol; and (4) rapidly adding the silicon source into the stabilized sol obtained in step (3) at a predetermined ratio within 1-30 minutes to obtain a resulting sol; and (5) subjecting the resulting sol obtained in step (4) to aging and stabilization at an unchanged temperature of 30-90° C. and an unchanged pH value of 6.0-12.0 for 10-180 minutes to obtain a first substance; and (6) subjecting the first substance obtained in step (5) to filtration and washing to a neutral pH value to obtain a second substance; and (7) subjecting the second substance obtained in step (6) to drying at 100-200° C. for 4-10 hours to obtain a third substance; and (8) putting the third substance obtained in step (7) in a Muffle furnace for calcination at 300-900° C. for 1-10 hours to obtain a metal-doped ferrosilicon catalyst.

3. The method according to claim 2, wherein the VIIB or VIIIB group transition metal salt comprises one or more of: manganese nitrate, manganese sulfate, cobalt nitrate, cobalt sulfate, nickel nitrate, nickel sulfate, copper nitrate, copper sulfate, zinc nitrate, and zinc sulfate.

4. A catalyst for residue suspended bed hydrocracking prepared by the method according to claim 3.

5. The method according to claim 2, wherein in step (2), the ferric salt is selected from one or more of: ferric nitrate, ferric chloride, ferric sulfate, ferric phosphate, and ferric perchlorate.

6. A catalyst for residue suspended bed hydrocracking prepared by the method according to claim 5.

7. The method according to claim 2, wherein in step (2), the alkaline solution is selected from one or more of: a sodium hydroxide solution, a potassium hydroxide solution, a sodium carbonate solution, a sodium bicarbonate solution, and ammonia.

8. A catalyst for residue suspended bed hydrocracking prepared by the method according to claim 7.

9. The method according to claim 2, wherein in step (2), the pH value is kept at 5-10.

10. A catalyst for residue suspended bed hydrocracking prepared by the method according to claim 9.

11. The method according to claim 2, wherein in step (4), the silicon source is selected from one or more of: water glass, sodium silicate, silica, industrial silica gel, silica sol, and tetraethyl orthosilicate.

12. A catalyst for residue suspended bed hydrocracking prepared by the method according to claim 11.

13. The method according to claim 2, wherein in step (4), the silicon source is added in an amount for controlling a molar ratio of a doping metal oxide to ferric oxide to silica at (1-10):(1-10):1.

14. A catalyst for residue suspended bed hydrocracking prepared by the method according to claim 13.

15. A catalyst for residue suspended bed hydrocracking prepared by the method according to claim 2.

16. A catalyst for residue suspended bed hydrocracking prepared by the method according to claim 1.

17. A method of applying the catalyst according to claim 16 in a residue suspended bed hydrocracking reaction, wherein the residue suspended bed hydrocracking reaction is carried out in a suspended bed reactor with a residue as a raw material at a temperature of 430° C. and an initial $H_2$ pressure of 11 MPa, the catalyst is used in an amount of 3 wt %, and a ratio of hydrogen to oil is 800 v/v.

* * * * *